C. E. EVANS.
BUNDLE BINDING AND TYING MACHINE.
APPLICATION FILED JAN. 11, 1918.

1,324,239.

Patented Dec. 9, 1919.
6 SHEETS—SHEET 4.

Inventor
Charles E. Evans

By *Foster Freeman Watson Hert*

Attorney

C. E. EVANS.
BUNDLE BINDING AND TYING MACHINE.
APPLICATION FILED JAN. 11, 1918.

1,324,239.

Patented Dec. 9, 1919.
6 SHEETS—SHEET 5.

INVENTOR
Charles E. Evans,
BY
*Foster Freeman Watson & Coit*
ATTORNEY

C. E. EVANS.
BUNDLE BINDING AND TYING MACHINE.
APPLICATION FILED JAN. 11, 1918.

1,324,239.

Patented Dec. 9, 1919.

Inventor
Charles E. Evans

UNITED STATES PATENT OFFICE.

CHARLES E. EVANS, OF SEATTLE, WASHINGTON.

BUNDLE BINDING AND TYING MACHINE.

1,324,239. Specification of Letters Patent. Patented Dec. 9, 1919.

Application filed January 11, 1918. Serial No. 211,448.

*To all whom it may concern:*

Be it known that I, CHARLES E. EVANS, a citizen of the United States, residing at Seattle, King county, State of Washington, have invented new and useful Improvements in Bundle Binding and Tying Machines, of which the following is a specification.

This invention relates to improvements in bundle binding and tying machines and more particularly to improvements in the machines described and claimed in my copending application No. 123,567 filed Octorber 3, 1916, and No. 9,311 filed Feb. 19, 1915, and renewed October 4, 1916, as No. 123,762.

The principal features of the present invention consist of a novel twisting mechanism, a novel frictionally actuated connection for controlling the bundle compressor and an arrangement of parts whereby the machine can be manufactured at a minimum cost and yet is efficient and dependable. Other features will be apparent from the description taken in connection with the drawings, in which.

Referring to the drawings, the main element of the frame of the machine consists of a vertical post 1 which has a broad base and a fixed head 10 upon which is carried the twister head and the means for operating it. The post also has an arm 2 extending horizontally beneath the twister head and adjustable vertically upon the post 1 to accommodate it to handle bundles of different heights.

The arm 2 is counterweighted by a weight 30 connected by a chain 3 or other flexible connector which has one end secured to the arm and then passes over a sprocket wheel or pulley, preferably within the hollow post 1 and thence down to the counterweight 30. Other means might be used for counterbalancing the weight of the arm and the parts carried thereby.

The arm 2 may be adjusted by means of a worm 31 secured upon a shaft which also carries a hand wheel 33, the worm 31 meshing with a worm wheel 32 which is secured to turn with the sprocket wheel carrying the chain 3. The arm 2 may thus be quickly adjusted and held in such position, as the worm wheel cannot drive the worm.

Figures 6, 7, 8:
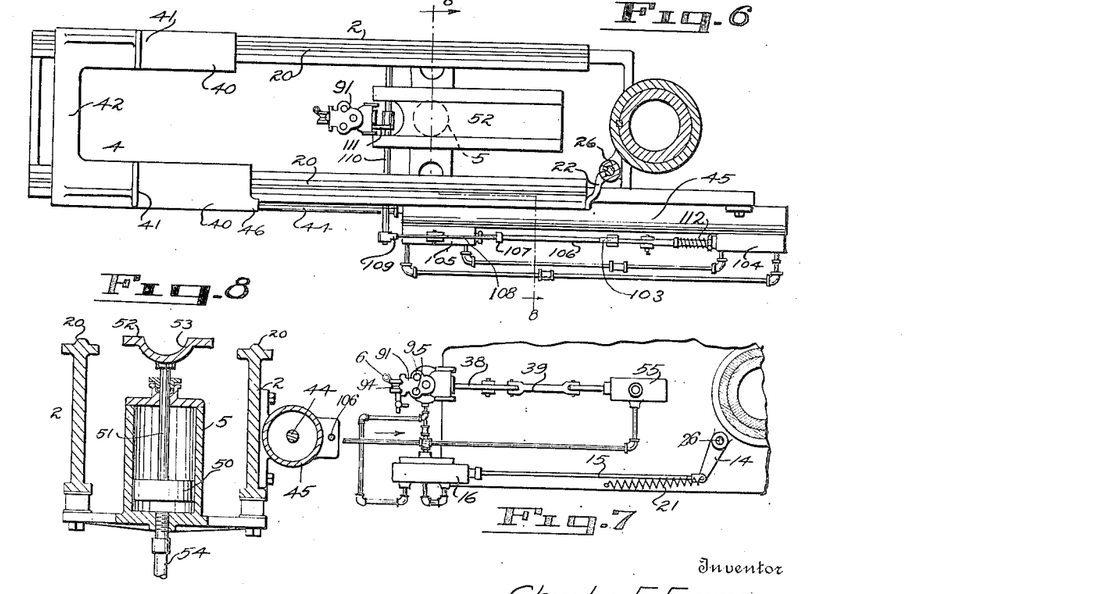
Fig. 6 is a sectional plan view taken substantially on the line 6—6 of Fig. 1 just above the bundle carrier and its supporting and guiding arm.
Fig. 7 is a fragmentary plan the post being in section which shows the air control for the compressing mechanism.
Fig. 8 is a vertical section through the compressor cylinder and the bundle carrier supporting and guiding arm taken substantially on the line 8—8 of Fig. 6.

The arm 2 is provided with guideways 20, Figs. 6 and 8, upon which is mounted the bundle carrier 4, which comprises the transversely separated plates 40 upon which the bundle is carried and the vertical abutments 41 connected rearwardly by the cross bar 42, thus leaving the center space open for the passage of the wire carrier or needle.

The bundle carrier has a downwardly extending arm 43 to which is connected the piston rod 44 connected to a piston in the cylinder 45. This cylinder, as well as the others used in this machine, are preferably connected with a supply of compressed air for their operation although they are adapted for actuation by any fluid pressure. In this manner the bundle carrier is reciprocated upon the arm 2.

The arm 2 carriers thereon, in a position to engage the bundle when the latter is in position for receiving the binding wire, a bundle compressor consisting of a cylinder 5 and piston 50. The piston rod 51 has a head 52 thereon which is normally carried low enough to be below the bottom of the bundle as it is brought over it by the carrier 4.

After the bundle is brought into operative position by the carrier, air is admitted beneath the piston 50, elevating the head 52 and the bundle to contact the latter with an abutment or arm 11, carried by the frame. This closely compresses and holds the bundle. The head 52 is formed with a central groove 53 through which the binding wire freely passes.

Figures 1, 2:
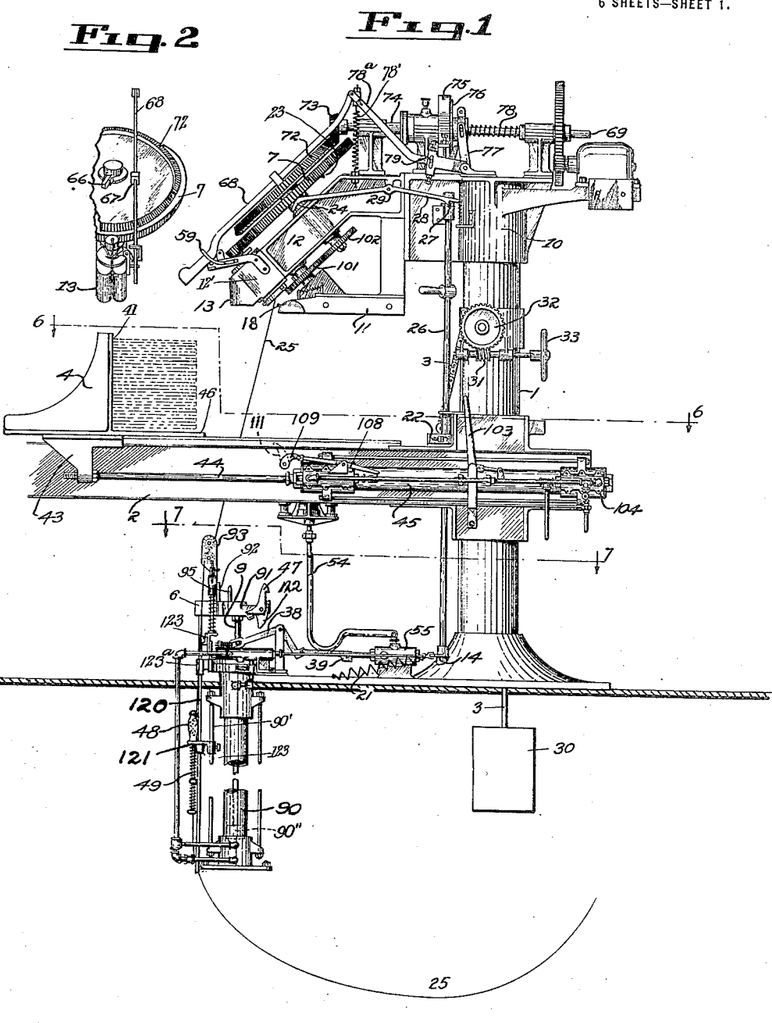
Figure 1 is a side elevation of my machine.
Fig. 2 is a front view of the twister head and the parts directly associated therewith.
Figure 4:
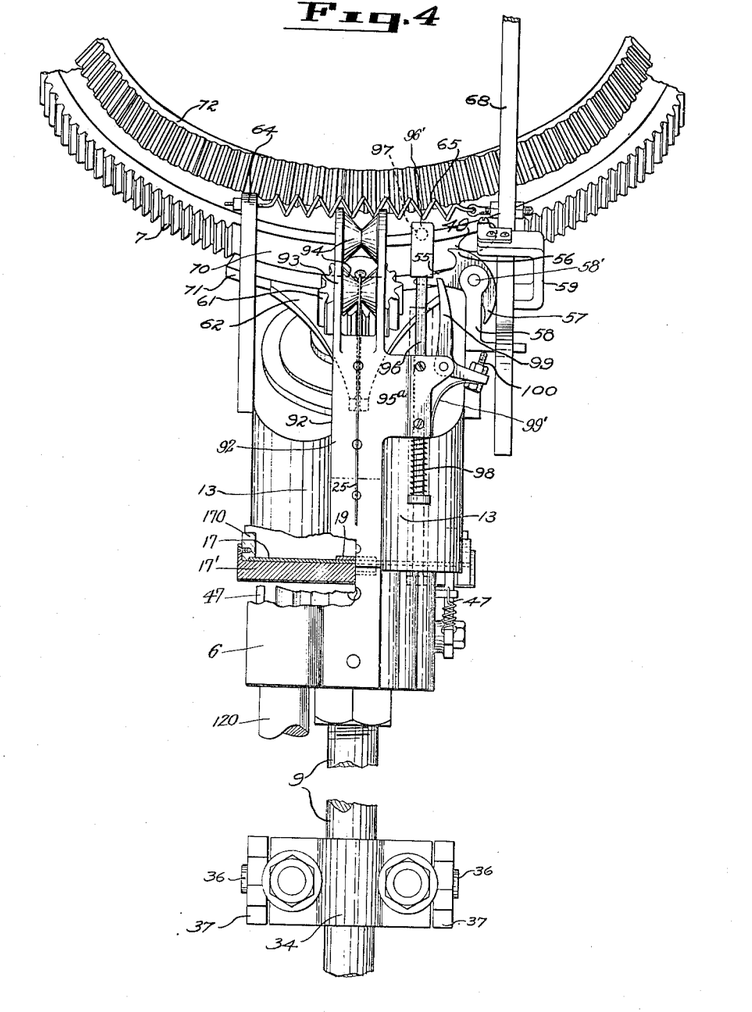
Fig. 4 is a front view on an enlarged scale of the twister head with the wire carrier in the same position as in Fig. 3.

The tying or twisting device comprises a central core 6 having the radial slot 60 adapted to receive the wire 25. It is mounted to turn freely in a bearing 12' secured to the frame member 12. This bearing has its outer part slit on a central plane to form an entrance channel for the wire, thus forming two cheeks 13 which preferably are rounded as shown in Figs. 2 and 4.

To the upper end of the core 6 is secured a similarly slotted pinion 61 which is operated by a gear 7 which has a smooth section 70 devoid of teeth. Gear 7 also carries a smooth segment bar 71 positioned at a lower level than its teeth. When the parts are at rest, the segment 71 engages the concave recess in a disk 62 which is connected to rotate with the twister device and which also has a slot 63 for the passage of the wire.

The gear 7 is coaxial and connected with the bevel gear 72 and the latter is driven by a bevel pinion 73 carried by a shaft 74, which in turn is driven from an alined and continuously running shaft 69 by means of a clutch 75. The movable member 76 of the clutch is controlled by a bell crank lever 77 and by spring 78. The bell crank lever has one arm engaging the movable part 76 of the clutch and its other arm has an extension 78ª, adjustable in angular position by a device at 79, to thereby regulate the exact engagement of the clutch parts.

A bar 68 is pivotally secured to the free end of lever arm 78ª and extends over the gear 72 and is held in place by a guide 59 which is carried by a frame member and embraces the bar 68. A spring 65 extending from bar 68 to a fixed member 64 holds the bar 68 toward the center line of the twister head. A pin or finger 66 revolving with the gear 72 (see Fig. 2) engages an adjustable stop 67 carried by bar 68 to thereby both stop the revolution of wheels 7 and 72 and to release the driving clutch.

An arm 58 carried by the bracket 12" secured to the bearing 12, has the releasing dog or lever pivoted thereon as at 58'. This dog has an arm or end 57 which engages the bar 68, an arm 56 which is engaged by a spring 49 to normally hold it in the position shown in Fig. 4, and an arm or finger 55 by which the parts are rotated to shift the bar to the right, as viewed in Fig. 4.

Figure 3:
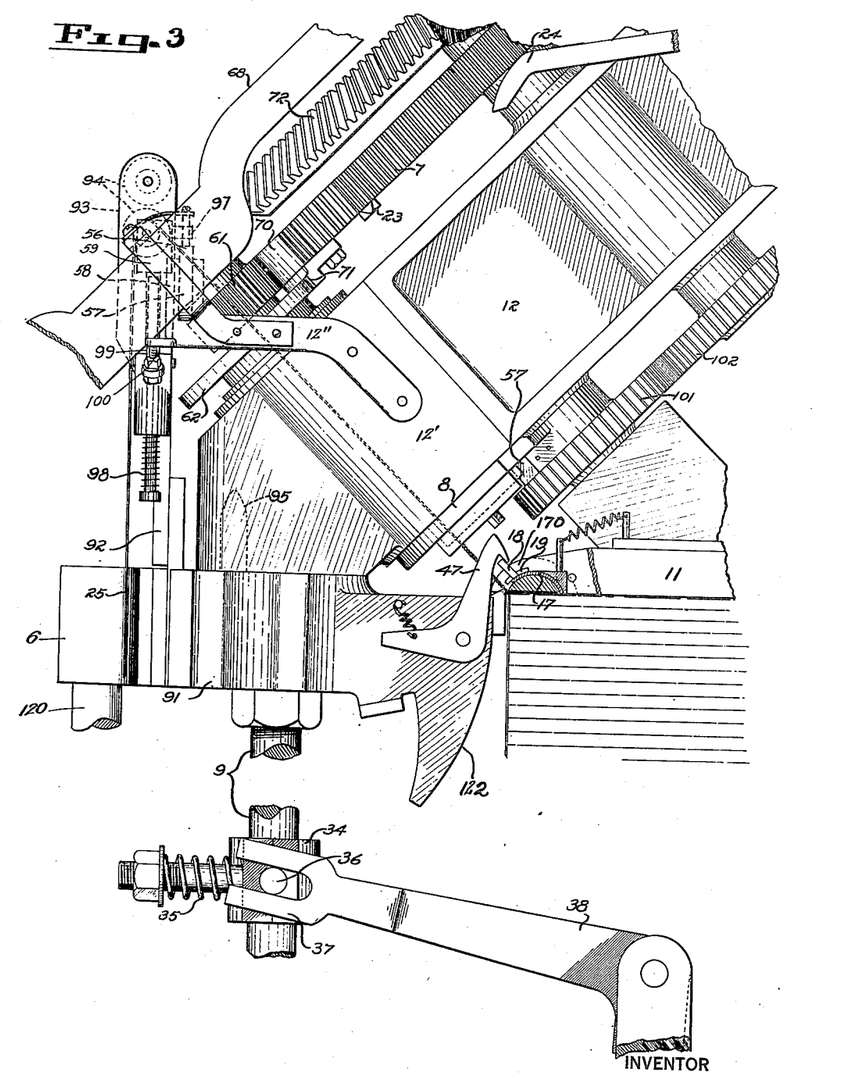
Fig. 3 is a side view of the twister head with the wire carrier or needle raised into position for delivering the wire to the twister head.
Figure 5:
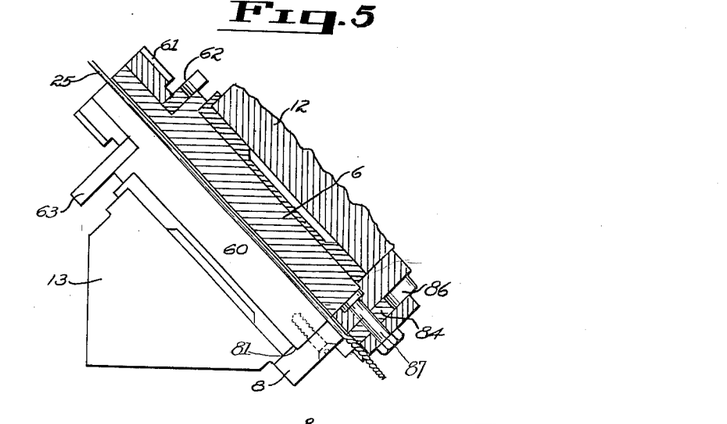
Fig. 5 is a section through the twister head on the line of the wire entering slot.

The parts of the wire twisting and cutting mechanism are shown separately in Figs. 9, 10, 11 and 12, and assembled in Figs. 3 and 5. A plate 8 is secured to the bottom of the twister head and is formed with the wire receiving slot 80 and a recess 81 in its upper surface to receive the lower end of the rotative head 6. On its underside, shown in Fig. 11, this plate is provided with a wire receiving and clamping groove 82 and an inserted wear plate 83 of hardened metal in which is formed a part of the groove 82.

The wire cutting wheel 84 is journaled on the bolt 87, the axis of which is at one side of the axis of the twister parts. The wheel 84 has a series of recesses extending inwardly from its periphery, forming the teeth 84', the lower corners of the sides of which form cutting members which coact with the plate 58ª, which may be of hardened steel to form wire cutting shears.

The finger 57ª carried by the gear 101 engages a tooth 84' so that at each revolution of the gear 101, the cutting disk 84 is rotated through a small angle thus cutting the wire in the slot 80. The gear 101 is equal in size to its driving gear 102 which is secured to the same shaft as gear 7, so that gear 101 rotates at the same speed as gear 7.

Figure 9:
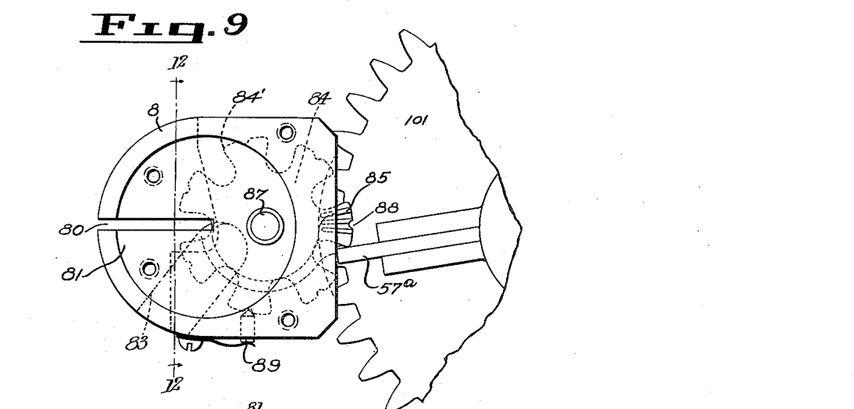
Fig. 9 is a top plan of the wire cutting device.
Figure 10:
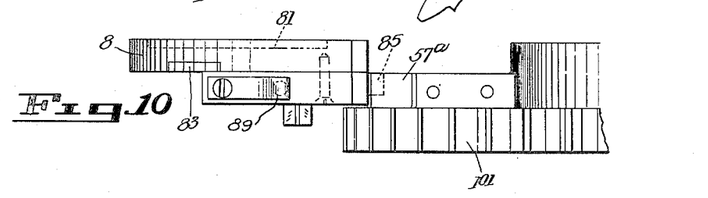
Fig. 10 is an edge view or elevation of the parts shown in Fig. 9.
Figure 11:
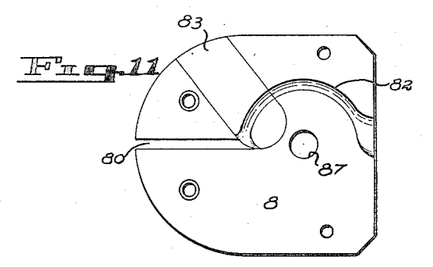
Fig. 11 is a bottom plan of the fixed plate which coöperates with the cutoff disk to hold the wire.
Figure 12:
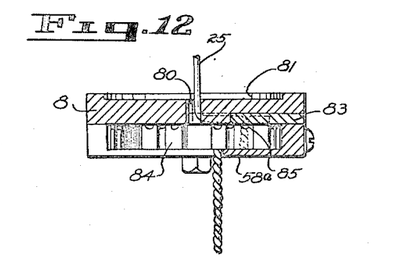
Fig. 12 is a cross section through the wire cut-off and holding parts taken substantially on the line 12—12 of Fig. 9.
Figure 13:
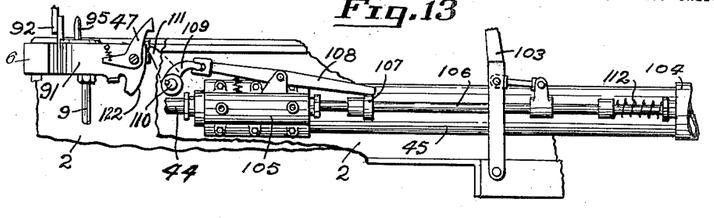
Fig. 13 is a side view of the means for controlling bundle carrier actuating piston.

The upper surface of the teeth are formed with radial grooves as shown at 85 in Figs. 9 and 12 whereby the end of the wire remaining after cutting is drawn into the groove 82 and held securely against the strain of putting the wire about the next bundle. This condition is shown in Fig. 12. To insure correct stopping and holding of the cutting disk each of the teeth may be formed with a peripheral notch 88 which is engaged by the pointed spring held bolt 89.

The wire carrier or needle comprises the vertically reciprocating rod or shaft 9 and the parts carried thereby, the rod 9 being the piston rod of an air cylinder 90 having the piston 90". The rod carries a head 91 to which is secured the bar 92 having the bifurcated ends 93 between which are mounted the wire guiding rollers 94. The head 91 has a registering pin or pins 95 which enter holes in the frame arm 13, to insure proper registry with the twister mechanism.

The arm or bar 92 has a side projection 95ᵃ (see Fig. 4) formed with a vertical bore for the tripper rod 96 which has a trip pin 97 located to strike the arm 55 of the dog which trips the rod 68, whereby the clutch is thrown into action. A spring 98 acts to draw the tripper rod 96 downward. A latch 99 normally holds the rod 96 with the spring compressed, a spring 99′ being provided to force the upper end of the latch or bell crank lever 99 under the head 96′ of the rod. A horizontal arm of the latch extends into position to engage with the arm 58 when the head 91 and the wire carrier reaches its uppermost position. A set screw 100 permits exact adjustment.

On its way up and before tripping the dog 99, the pin 97 lifts and passes the arm 55 of the dog so that when the tripper rod 96 is released the pin 97 strikes this arm 55 and causes the arm 57 to push the bar 68 over enough to release the stop 67 from engagement with the arm 66. In consequence, the spring 78 is permitted to apply the clutch and the rotation of the wheels 7 and 72 starts. For the purpose of aiding this action a spring 78′ is interposed between the upper end of rod 68 and the frame.

The passing of the segment 71 beyond the axis of the twister frees it for turning and engagement of the teeth of wheel 7 with the pinion 61, starts the twister mechanism to turning which continues until the blank space 70 is reached, whereupon the segment bar 71 engages the recess 62 in the revolving plate 63 to stop and lock it. At about this time also the finger 57 engages the cutting disk to turn it one space to cut the wire.

Figure 14:
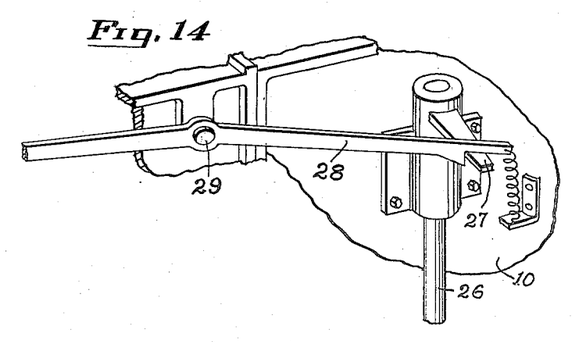
Fig. 14 shows the locking lever for holding the vertical valve controlling shaft at one limit of its movement.

Alongside the post 1 is journaled a vertical shaft 26 having on its upper end an arm or collar 27 see Fig. 14, which is engaged by a locking lever 28 which is pivoted at 29 and has its other end 24 curved down and normally close to or just engaging the bottom surface of wheel 7. A lug or tooth 23 carried by wheel 7 by engaging the end 24 will lift the opposite end to free the arm 27 and thus permit backward turning of the shaft 26. This is timed to occur toward the completion of the cycle of operations.

The shaft 26 has an arm 22 positioned to be engaged by the toe 46 of the bundle carrier just as it finishes its inward stroke to rock the said shaft. The holding arm 28 engages the arm 27 of the shaft to prevent return of the shaft, even after the bundle carrier returns. A spring 21 connected with an arm 14, carried by shaft 26, tends to rock the shaft backward into normal position.

A rod 15, see Fig. 7, also connected with arm 14, actuates an air valve in a cylinder 16 to admit air to the cylinder 90 by which the wire carrier or needle is raised. Being actuated from the movement of the bundle carrier, this can happen only after the bundle has been advanced to displace the wire 25, thereby placing the wire about three sides of the bundle. The upward movement of the wire carrier places it about the fourth side.

The shaft 9 has a split block 34, see Fig. 3. the two parts of which are held together by a spring 35 so that it grips the shaft 9 enough to produce a slight friction, so as to swing the bell crank lever 38 which is engaged therewith, by means of pin 36 which enters a yoke 37 at the end of the lever. The lever 38 is connected by a link 39 with the stem of a valve in casing 55 which controls the air supplied to the compressor cylinder 5. This air is supplied through a hose 54, so that adjustments of the arm 2 will not affect the supply.

When the wire carrier starts to drop, the same frictional grip on the shaft 9 will throw the valve in casing 55 back and release the air in cylinder 5, thus dropping the bundle compressing piston. The dropping of the wire carrier is caused by the backward rocking of the shaft 26 when it is released by the movement of the holding lever 28 when engaged by the lug 23 on wheel 7. This occurs shortly before completion of the revolution of the wheel.

Figure 15:
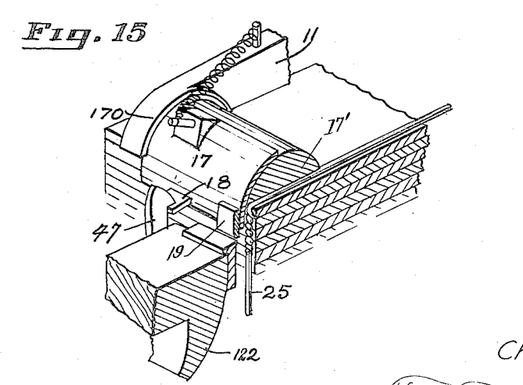
Fig. 15 is a detail of the mechanism for bending or tucking down the knot.

Mounted upon the abutment arm 11, or upon a suitable frame member, is a device for turning down the twisted ends of the wire. This is best shown in Figs. 3 and 15. A curved plate 17 is mounted for angular movement on the semi-cylindrical block 17′ and guided at its ends by suitable curved members 170′. An arm 18 projects from the plate so that it may be engaged by a spring-held latch 47, pivotally mounted upon the head 91. This engages the arm 18 to rock it over when the head drops. A lip 19 carried by the rocking member 17 engages the twisted ends of the wires and bends them over and down close against the side of the bundle.

When the machine is in position for the reception of a bundle to be bound, the wire extends across the path of the bundle carrier, as in Fig. 1. Its end is secured between the cutoff wheel 84 and the plate 8, as is shown in Fig. 12. It extends thence through the wire carrier, thence through a tension device and thence to a coil or roll, suitably placed for delivering wire as needed.

Figure 16:
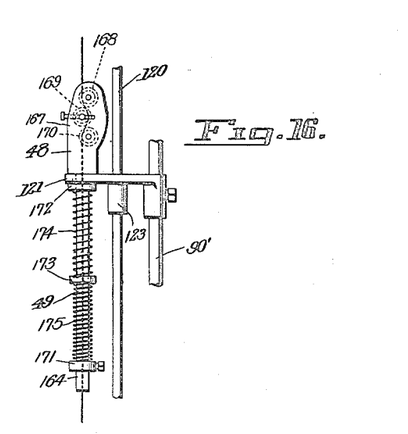
Fig. 16 is an enlarged view of the wire tensioning device.

The tension device 48 is carried by a bracket 121 secured to a rod 90′ of the cylinder 90. Referring to Figs. 1 and 16, the tension device is shown as consisting of a hollow bar or pipe 164 which extends through a hole in the bracket 121, and carries at its upper end two spaced apart flat plates 167. A series of three rollers 168, 169 and 170 are mounted on axes secured in the said flat plates. The axes of the top and bottom rollers 168 and 170, are parallel and vertically in line. The axis of the intermediate roller 169 however, is arranged at one side vertically of the other two rollers so that a bend is produced in the wire as it passes over these rollers. Furthermore, this central roller 169 has its axis mounted for adjustment laterally whereby the extent of the bent portion of the wire may be varied. At its lower end the bar 164 has secured thereto a collar 171 and just below and in contact with the bracket 121 is a loosely mounted collar 172 and intermediate these two collars is a third and loosely mounted collar 173. A spring 174 is interposed between the collars 172 and 173 and a stronger spring 175 is interposed between the collars 173 and 171. Thus it will be apparent that when the wire is drawn upward because of the bend produced therein by the rollers 168, 169 and 170, the entire tension device will tend to be lifted upward and this upward tendency will be opposed by the springs 174 and 175. Thus a tension or resistance is provided for the wire and this tension may be varied by adjusting the central roller 169.

In order to reinforce the piston rod 9 against bending, a rod 120 is secured at its upper end to the head 91 and is slidingly mounted in the bearings 123 and 123ª, the latter on the bracket 121. In this manner the head 91 is constrained to move in a straight path so that, at the upper limit of its movement, the pin 9 registers with the coöperating recess in the bearing block 12'.

In the operation of the machine a bundle is placed on the bundle support or carrier when the latter is in the position shown in Fig. 1. The operator then grasps the lever 103 and pushes it to the right thereby compressing the spring 112 and moving the block 107 to the right so that the lever 108 catches on the flange to hold the valve rod 106. This movement of the valve rod manipulates the valves to admit fluid pressure so that the piston rod 44 will be drawn into the cylinder 45, thereby moving the bundle carrier to the right as viewed in Fig. 1. As the said carrier nears the end of its forward movement the toe 46 strikes the arm 22 thereby rotating the vertical rod 26 and moving the arm 27 at the top thereof so that it is caught in the notch formed in the end of the lever 28. This rotation of the rod 26 actuates the arm 14 to move the valve rod 15 of the bottom cylinder 90 to manipulate the valves thereof for the admission of fluid pressure which actuates the piston rod 9 to raise the wire carrier or needle. The upward movement of this carrier 91, through the friction connection 34 on the piston rod 9 tips the lever 38 and actuates the valve 55 so that fluid under pressure is admitted to the compressor 5. It will be observed that this valve is therefore actuated so that the compressor will act on the bundle just after the wire carrier has started on its upward movement. Before the bundle is moved inwardly the binding wire extends from the twister down across the path of the bundle to the tension device. Consequently, when the bundle moves inward it pushes the wire ahead of it and thereby arranges the same on substantially the three sides thereof. When the wire carrier moves upward it carries with it the wire and thus arranges the same on the front or remaining side of the bundle, and in this upward movement the head 91 of the carrier strikes the arm 111 thereby tripping the lever 108 and permitting the spring 112 to return the valve rod 106 to its original position. This will manipulate the valves of the cylinder 45 so that the piston rod 44, together with the bundle carrier will be moved to the left as viewed in Fig. 1 to its original position ready to receive another bundle. The wire carrier continues on its upward movement and when it has almost completed the same the set screw 100 will strike the abutment 58 thereby tripping the plunger or rod 96 so that the pin 97 carried thereby will engage and turn the arm 55 of the dog, the other arm 59 of which acts to move the bar 68 laterally, or to the right as viewed in Fig. 2 to free the dog 67 from the arm 66. As the bar 68 is no longer held the springs 78 and 78' act to cause the engagement of the clutch members 75 and 76. Thus the rotation of the clutch member 76 will be communicated to the clutch member 75 and through the gearing to the twister mechanism. The gears 72, 7 and 102 are all mounted on the same shaft and rotate with the same angular velocity. During the first portion of the rotation of the gear 7 the segment 71 is carried out of register with the recess 62 in the disk 63 and immediately thereafter the teeth on the said gear mesh with the pinion 61 on the twister thereby rotating the latter. This rotation continues until the smooth or cut-away portion of the periphery of the gear again comes opposite the pinion 61, whereupon the latter is no longer driven. At about this time, however, the projection 57ª carried by the gear 101 operates the cutting disk 84 to cut or sever the binder. At this same time the arm 66 engages the block 67 on the rod 68 causing it to move upward as viewed in Figs. 1 and 2, thus disengaging the clutch members and the driving of the twisting mechanism. When the gear 7 has nearly completed its rotation the lug 23 will strike the end 24 of the lever 28 and trip the latter from the arm 27 thereby freeing the rod 26. The spring 21 thereupon acts on the arm 14 to return the rod to its original position and also to actuate the valve rod 15 to draw the piston in the cylinder 90 downward thereby moving the wire carrier downward to its low position. Shortly after the beginning of this downward movement the hook 47 on the needle will engage the tucking mechanism to manipulate the same to tuck the knot against the bundle. At about the same time this downward movement of the needle through the friction connection 34 operates the valve 55 to relieve the compressor 5, so that the bundle may be removed from the machine. The head 91 of the needle is formed with the curved shoe 122 so that the head may pass the arm 111 by merely pushing it to one side. When the wire carrier has nearly reached its low position the end of the tripper rod 96 strikes the abutment 123 on the cylinder 90, and further movement of the carrier moves the rod upward, compressing the spring 98, and permitting the spring 99' to force the upper end of latch 99 under the head 96', of the rod, to thereby hold it in cocked position.

The cylinder and operating mechanism above described may be pneumatically actuated very efficiently but of course the cylinders are adapted to be used in connection with any fluid pressure. Although the preferred embodiment of the invention has been illustrated and described it is obvious that many changes may be made therein without departing from the spirit of the invention.

Having thus described the invention what is claimed is:

1. In a machine of the class described, means for compressing the bundle, a wire carrier, and means for controlling said compressing means including a member having frictional engagement with said carrier.

2. In a machine of the class described, means for compressing the bundle, a wire carrier including a slidably mounted rod, and means for controlling said compressing means including a lever one end of which is frictionally connected to said rod.

3. A bundle binding and tying machine including in combination, a fluid actuated compressor for the bundle, a valve controlling said compressor, a reciprocating wire carrier, and means frictionally engaging the carrier connected to operate said valve.

4. A bundle binding and tying machine including in combination, a fluid actuated compressor for the bundle, a valve controlling said compressor, a reciprocating wire carrier, and a bell crank lever having one arm frictionally connected to the carrier and the other arm connected to the valve.

In testimony whereof I affix my signature in presence of two witnesses.

CHARLES E. EVANS.

Witnesses:
A. G. STUEDEMAN,
MARK HARPER.